(12) United States Patent
Kanyal et al.

(10) Patent No.: US 12,386,930 B2
(45) Date of Patent: Aug. 12, 2025

(54) IDENTIFIER MAPPING TECHNIQUES FOR CROSS NODE CONSISTENCY

(71) Applicant: Rubrik, Inc., Palo Alto, CA (US)

(72) Inventors: Sandeep Kanyal, Bangalore (IN); Rajesh Kumar Jaiswal, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 240 days.

(21) Appl. No.: 18/121,510

(22) Filed: Mar. 14, 2023

(65) Prior Publication Data

US 2024/0311451 A1   Sep. 19, 2024

(51) Int. Cl.
 *G06F 21/31* (2013.01)
 *G06F 16/182* (2019.01)

(52) U.S. Cl.
 CPC .......... *G06F 21/31* (2013.01); *G06F 16/182* (2019.01)

(58) Field of Classification Search
 CPC ............................ G06F 21/31; G06F 16/182
 See application file for complete search history.

(56) References Cited

U.S. PATENT DOCUMENTS

| | | | | |
|---|---|---|---|---|
| 6,618,394 B1* | 9/2003 | Hilleary | ................ | H04L 9/40 370/464 |
| 8,176,012 B1* | 5/2012 | Rabii | ................ | G06F 16/1824 707/655 |
| 9,043,890 B1* | 5/2015 | Luo | ................ | G06F 21/31 726/7 |
| 9,069,444 B1* | 6/2015 | Hansen | ................ | G06F 16/178 |
| 9,319,379 B1* | 4/2016 | Burcham | ................ | H04W 8/26 |
| 9,438,604 B1* | 9/2016 | Addala | ................ | H04L 63/0853 |
| 9,780,950 B1* | 10/2017 | Dundas | ................ | H04L 9/08 |
| 9,942,200 B1* | 4/2018 | Tan | ................ | H04L 63/0281 |
| 10,091,290 B1* | 10/2018 | Hansen | ................ | H04L 67/1097 |
| 10,153,897 B1* | 12/2018 | Jezewski | ................ | H04L 9/083 |
| 10,229,424 B1* | 3/2019 | Liu | ................ | G06Q 30/02 |
| 10,248,973 B1* | 4/2019 | Buller | ................ | G06Q 30/0275 |
| 10,299,118 B1* | 5/2019 | Karachiwala | ................ | H04L 67/55 |
| 10,375,563 B1* | 8/2019 | Bellam | ................ | H04L 63/104 |
| 10,657,558 B1* | 5/2020 | Lindsay | ................ | G06Q 30/0254 |
| 10,715,604 B1* | 7/2020 | Bao | ................ | H04L 67/306 |
| 10,735,398 B1* | 8/2020 | Covati | ................ | H04L 63/0838 |
| 10,783,235 B1* | 9/2020 | Agarwal | ................ | G06F 21/45 |
| 10,952,077 B1* | 3/2021 | Holt | ................ | H04W 12/069 |
| 11,115,410 B1* | 9/2021 | Hanson | ................ | H04L 63/0861 |
| 11,132,126 B1* | 9/2021 | Chmiel | ................ | G06F 11/1466 |
| 11,184,765 B2* | 11/2021 | Suwirya | ................ | H04W 4/80 |

(Continued)

*Primary Examiner* — Aravind K Moorthy

(74) *Attorney, Agent, or Firm* — Holland & Hart LLP

(57) ABSTRACT

Methods, systems, and devices for data management are described. A server hosted by a storage node within a cluster of a data management system (DMS) may receive a request to access a file stored in a distributed file system. The request may be associated with a security identifier (SID). The server may transmit an indication of the SID to a shared repository accessible to the cluster. Accordingly, the server may receive an indication of a mapping between the SID and one or both of a user identifier (UID) or a group identifier (GID) associated with the SID. The server may transmit an indication of the file and the UID/GID to the distributed file system, which may compare the UID/GID to a list of authorized identifiers for the file. If the UID/GID is on the list of authorized identifiers, the distributed file system may execute the request accordingly.

20 Claims, 10 Drawing Sheets

(56) References Cited

U.S. PATENT DOCUMENTS

| | | | | |
|---|---|---|---|---|
| 11,216,581 B1* | 1/2022 | Arikapudi | | G06F 21/31 |
| 11,233,636 B1* | 1/2022 | Peddada | | H04L 9/085 |
| 11,244,067 B1* | 2/2022 | Child | | G06F 16/283 |
| 11,694,213 B1* | 7/2023 | Everly | | G06F 16/2379 |
| | | | | 705/4 |
| 11,714,918 B1* | 8/2023 | Kondal | | G06F 21/604 |
| | | | | 726/30 |
| 11,863,530 B1* | 1/2024 | Sreekumar | | H04L 63/20 |
| 2002/0111988 A1* | 8/2002 | Sato | | B25J 9/1676 |
| | | | | 709/217 |
| 2003/0101200 A1* | 5/2003 | Koyama | | G06F 16/182 |
| 2006/0190742 A1* | 8/2006 | Ebitani | | G06F 21/602 |
| | | | | 713/193 |
| 2008/0154903 A1* | 6/2008 | Crowley | | G06F 16/182 |
| | | | | 707/999.009 |
| 2009/0017805 A1* | 1/2009 | Sarukkai | | H04W 28/06 |
| | | | | 455/414.3 |
| 2009/0300364 A1* | 12/2009 | Schneider | | H04L 63/08 |
| | | | | 713/181 |
| 2011/0093941 A1* | 4/2011 | Liu | | G06F 21/305 |
| | | | | 709/219 |
| 2011/0184993 A1* | 7/2011 | Chawla | | G06F 16/182 |
| | | | | 718/1 |
| 2012/0198268 A1* | 8/2012 | Qureshi | | H04L 65/1063 |
| | | | | 709/217 |
| 2012/0221694 A1* | 8/2012 | Darcy | | H04L 67/51 |
| | | | | 709/223 |
| 2013/0024925 A1* | 1/2013 | Venkataramani | | H04L 63/083 |
| | | | | 726/7 |
| 2013/0198857 A1* | 8/2013 | Maier | | G06F 21/60 |
| | | | | 726/27 |
| 2013/0275307 A1* | 10/2013 | Khan | | H04W 12/068 |
| | | | | 705/64 |
| 2013/0333003 A1* | 12/2013 | Roy | | H04L 63/0807 |
| | | | | 726/5 |
| 2014/0032708 A1* | 1/2014 | Zamir | | G06F 16/9537 |
| | | | | 709/217 |
| 2014/0082138 A1* | 3/2014 | Ogura | | H04L 63/0407 |
| | | | | 709/217 |
| 2014/0143153 A1* | 5/2014 | Suzuki | | G06F 21/35 |
| | | | | 705/51 |
| 2014/0279519 A1* | 9/2014 | Mattes | | G06Q 20/12 |
| | | | | 705/44 |
| 2014/0282818 A1* | 9/2014 | Singer | | H04L 63/0263 |
| | | | | 726/1 |
| 2014/0325640 A1* | 10/2014 | Aggarwal | | G06F 21/31 |
| | | | | 726/18 |
| 2014/0364099 A1* | 12/2014 | Pai | | G06F 21/88 |
| | | | | 455/418 |
| 2015/0033292 A1* | 1/2015 | Nguyen | | H04L 67/568 |
| | | | | 709/219 |
| 2015/0067109 A1* | 3/2015 | Tang | | H04L 67/1097 |
| | | | | 709/219 |
| 2015/0112864 A1* | 4/2015 | Wallaja | | G06Q 20/02 |
| | | | | 705/44 |
| 2015/0135275 A1* | 5/2015 | Matsugashita | | H04L 63/10 |
| | | | | 726/4 |
| 2015/0236908 A1* | 8/2015 | Kim | | H04L 12/2825 |
| | | | | 709/221 |
| 2015/0248706 A1* | 9/2015 | Mi | | H04L 67/535 |
| | | | | 705/14.53 |
| 2015/0271177 A1* | 9/2015 | Mun | | H04L 63/0853 |
| | | | | 726/7 |
| 2015/0304806 A1* | 10/2015 | Vincent | | H04W 4/02 |
| | | | | 455/456.3 |
| 2016/0134619 A1* | 5/2016 | Mikheev | | H04L 63/0884 |
| | | | | 726/8 |
| 2016/0140140 A1* | 5/2016 | Darcy | | H04L 67/1097 |
| | | | | 707/827 |
| 2016/0219044 A1* | 7/2016 | Karunakaran | | H04W 12/37 |
| 2016/0366225 A1* | 12/2016 | Jin | | G06F 16/1727 |
| 2017/0070497 A1* | 3/2017 | McCallum | | H04L 9/3231 |
| 2017/0124105 A1* | 5/2017 | Kaushik | | G06F 16/148 |
| 2017/0250972 A1* | 8/2017 | Ronda | | H04L 9/0891 |
| 2017/0251025 A1* | 8/2017 | Varley | | H04L 63/20 |
| 2017/0295174 A1* | 10/2017 | Kim | | G06F 21/32 |
| 2017/0310707 A1* | 10/2017 | Amelchenko | | H04L 63/102 |
| 2017/0322992 A1* | 11/2017 | Joseph | | G06F 16/25 |
| 2017/0324729 A1* | 11/2017 | Hon | | H04L 63/083 |
| 2018/0018336 A1* | 1/2018 | Zhang | | G06F 16/248 |
| 2018/0061155 A1* | 3/2018 | Ghorpade | | G07C 9/00571 |
| 2018/0069966 A1* | 3/2018 | Laden | | H04M 15/7652 |
| 2018/0218168 A1* | 8/2018 | Goel | | G06F 21/6245 |
| 2018/0227290 A1* | 8/2018 | Yang | | H04L 9/3213 |
| 2018/0227327 A1* | 8/2018 | Blackstein | | H04L 63/0869 |
| 2018/0309742 A1* | 10/2018 | Kato | | G06F 21/6218 |
| 2018/0349880 A1* | 12/2018 | Steele | | H04W 4/12 |
| 2018/0357432 A1* | 12/2018 | Tang | | H04L 67/14 |
| 2019/0019185 A1* | 1/2019 | Chitalia | | G06Q 20/227 |
| 2019/0037527 A1* | 1/2019 | Griffin | | H04W 88/10 |
| 2019/0058919 A1* | 2/2019 | Cahill | | H04N 21/25866 |
| 2019/0132613 A1* | 5/2019 | Jiao | | H04N 21/2743 |
| 2019/0138653 A1* | 5/2019 | Roller | | G06F 40/35 |
| 2019/0260741 A1* | 8/2019 | Ashok | | H04L 63/083 |
| 2019/0304609 A1* | 10/2019 | Ishikawa | | G16H 30/20 |
| 2019/0342097 A1* | 11/2019 | Wisgo | | H04L 9/085 |
| 2019/0370406 A1* | 12/2019 | Bose | | H04L 41/0893 |
| 2020/0036773 A1* | 1/2020 | Dar | | H04L 67/10 |
| 2020/0036802 A1* | 1/2020 | Bullock | | G06N 20/00 |
| 2020/0059703 A1* | 2/2020 | Sonare | | H04N 21/23418 |
| 2020/0084633 A1* | 3/2020 | Soliman | | H04W 12/068 |
| 2020/0092282 A1* | 3/2020 | Childress | | G06F 21/44 |
| 2020/0264690 A1* | 8/2020 | Vasipalli | | H02J 3/16 |
| 2020/0279035 A1* | 9/2020 | Chang | | H04M 1/724094 |
| 2020/0304441 A1* | 9/2020 | Bradley | | G06N 3/045 |
| 2020/0311708 A1* | 10/2020 | Bermudez | | G06Q 20/4016 |
| 2020/0382927 A1* | 12/2020 | Leduc | | H04W 8/183 |
| 2021/0058469 A1* | 2/2021 | Popelka | | H04L 67/10 |
| 2021/0109897 A1* | 4/2021 | Brechbuhl | | G06Q 10/10 |
| 2021/0111875 A1* | 4/2021 | Le Saint | | H04L 9/3263 |
| 2021/0234677 A1* | 7/2021 | Isenhour | | H04L 63/0807 |
| 2021/0258401 A1* | 8/2021 | Sullivan | | H04W 4/08 |
| 2021/0273817 A1* | 9/2021 | Deriso | | H04L 9/083 |
| 2021/0279295 A1* | 9/2021 | Koneru | | G06F 21/6218 |
| 2021/0334094 A1* | 10/2021 | Maartens | | G06F 40/106 |
| 2021/0344492 A1* | 11/2021 | Goodsitt | | H04L 9/3215 |
| 2022/0014915 A1* | 1/2022 | Chauhan | | H04N 21/25841 |
| 2022/0078255 A1* | 3/2022 | Kitabatake | | G06Q 30/06 |
| 2022/0104105 A1* | 3/2022 | Raffa | | H04L 65/4015 |
| 2022/0116385 A1* | 4/2022 | Hertrich | | H04L 9/0825 |
| 2022/0122741 A1* | 4/2022 | Mody | | H04W 12/088 |
| 2022/0209954 A1* | 6/2022 | Na | | H04L 9/3226 |
| 2022/0321638 A1* | 10/2022 | Li | | H04L 51/10 |
| 2022/0345298 A1* | 10/2022 | Cap | | H04L 9/0869 |
| 2023/0164140 A1* | 5/2023 | Israeli | | H04L 63/0807 |
| | | | | 726/9 |
| 2023/0169195 A1* | 6/2023 | Shah | | G06F 21/6245 |
| | | | | 726/30 |
| 2023/0177184 A1* | 6/2023 | Sebesta | | G06F 21/6209 |
| | | | | 726/26 |
| 2023/0179998 A1* | 6/2023 | McCracken, Jr. | | H04W 12/06 |
| | | | | 726/6 |
| 2023/0188528 A1* | 6/2023 | Arora | | H04L 63/0807 |
| | | | | 726/4 |
| 2023/0230067 A1* | 7/2023 | Upadhye | | G06Q 20/3821 |
| | | | | 705/65 |
| 2023/0237170 A1* | 7/2023 | Thummala | | G06F 21/6218 |
| | | | | 726/26 |
| 2024/0031371 A1* | 1/2024 | Batni | | H04L 63/102 |
| 2024/0078297 A1* | 3/2024 | Bhatia | | G06F 3/011 |
| 2024/0095779 A1* | 3/2024 | Maity | | G06N 5/022 |

* cited by examiner

IDENTIFIER MAPPING TECHNIQUES FOR CROSS NODE CONSISTENCY

FIELD OF TECHNOLOGY

The present disclosure relates generally to data management, including techniques for identifier mapping techniques for cross-node consistency.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
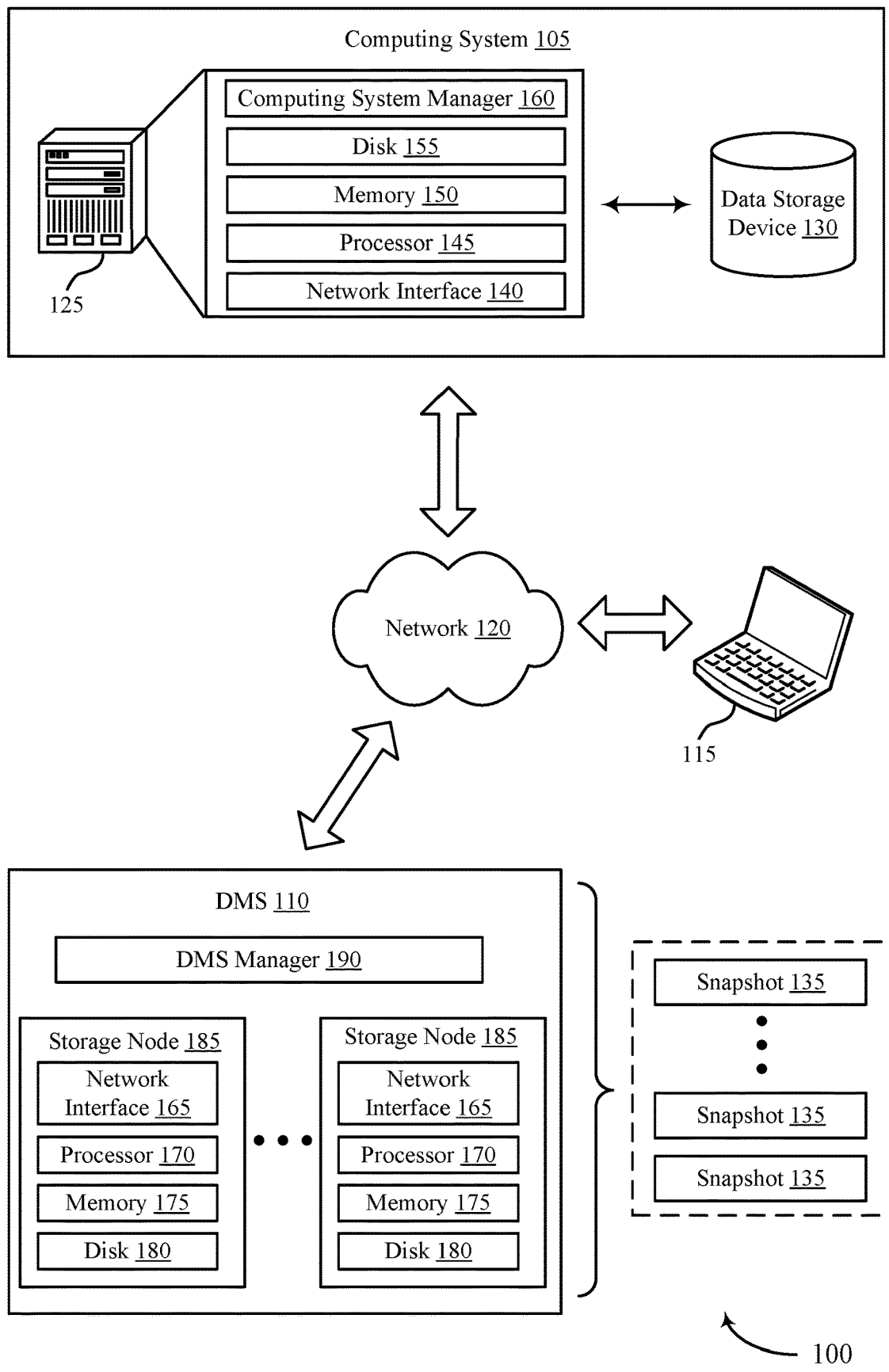
FIGS. 1 and 2 illustrate examples of computing environments that support identifier mapping techniques for cross-node consistency in accordance with aspects of the present disclosure.

Server Message Block (SMB) is a network file sharing protocol that enables client applications to read and write to files, request services from programs in a computer network, etc. SMB is the predecessor to the Common Internet File System (CIFS) Protocol. That is, CIFS is a particular implementation of the SMB protocol. Samba is a Linux/Unix implementation of the SMB/CIFS protocol that enables Unix and Linux-based client applications to access SMB/CIFS shares and communicate with SMB/CIFS services. In some cases, a node within a cloud data management (CDM) cluster of a data management system (DMS) may use a Samba server (e.g., a server running open-source Samba software) to expose an SMB share, which is then used to ingest data and/or expose snapshots to external CIFS clients for different purposes (i.e., live mount, database restoration).

When data is backed up using an SMB share, a CIFS client may write data to the SMB share. To do so, however, the Samba server may have to convert a Windows security identifier (SID) of the CIFS client to a user identifier (UID) or group identifier (GID) that can be recognized/interpreted by the Unix-based file system backing the Samba server. Similarly, when the CIFS client reads data from the Samba server, the underlying UID/GID of the source file (from which the data is read) may be converted to a corresponding SID of the CIFS client (which may correspond to a user or a group of users). In some implementations, however, each node in the CDM cluster may have a different SID/UID/GID mapping (that is, different nodes of the CDM cluster may map the same SID to different UIDs or GIDs), which can lead to access control issues, among other potential issues.

Aspects of the present disclosure support techniques for ensuring that SID/UID/GID mappings are consistent across nodes in a CDM cluster. For example, instead of maintaining a local SID/UID/GID mapping on each Samba server, a shared repository may be used to create and maintain a global SID/UID/GID mapping that is accessible to and used by all nodes in the CDM cluster. As one example, the shared repository may be within the CDM cluster. As another example, the global SID/UID/GID mapping may be stored/managed at a repository that is accessible to multiple clusters, such as a unified service platform of the DMS, in which case the same global SID/UID/GID mapping can be used across different CDM clusters.

To access the global SID/UID/GID mapping, individual Samba servers may provide the SID of a CIFS client to a central database server (or unified service platform) that manages the shared repository. The central database server may search the global SID/UID/GID mapping to determine whether there are any existing entries for the SID. If the SID is present in the global SID/UID/GID mapping, the central database server may pull the UID(s)/GID(s) attached to the SID and return these to the Samba server. Otherwise, the central database server may assign a new UID/GID to the SID, store the new UID/GID in association with the SID, and return the new UID/GID to the Samba server. Accordingly, the Samba server may use the UID/GID provided by the central database server to process the request from the CIFS client.

Aspects of the present disclosure may be implemented to realize one or more of the following advantages, among other possible benefits. For example, the techniques described herein may ensure that mappings between Windows-based SIDs and Linux/Unix-based UID/GIDs are consistent across nodes within a cluster (and potentially across clusters), thereby ensuring that unauthorized users (e.g., users with insufficient privileges) are not able to inadvertently gain access to files, and that authorized users (e.g., users with sufficient privileges) are not inadvertently denied access to files due to mapping inconsistencies. The described techniques may also support greater processing efficiency and reduced storage overhead, as individual nodes can retrieve SID/UID/GID entries from a global mapping (stored in a shared repository) rather than maintaining separate SID/UID/GID mappings at each node.

FIG. 1 illustrates an example of a computing environment 100 that supports identifier mapping techniques for cross-node consistency in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces, such as graphical user interfaces (GUIs), to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may include a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof.

The memory 150 may include one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may include hardware storage devices. The computing system manager 160 may manage the computing system 105 or aspects thereof (e.g., based on instructions stored in the memory 150) and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, where shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure.

For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may include one or more types of memory (e.g., RAM, SRAM, DRAM, ROM, EEPROM, Flash, etc.). A disk 180 may include one or more HDDs, one or more SDDs, or any combination thereof. Memories 175 and disks 180 may include hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable.

Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160) may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time).

Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135.

To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware).

Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In accordance with aspects of the present disclosure, a Samba server hosted by a storage node 185 within a cluster of storage nodes 185 of the DMS 110 may receive a request to access a file stored in a distributed file system of the DMS 110. The request may be associated with a SID. The Samba server may transmit an indication of the SID to a shared repository accessible to the storage nodes 185 of the cluster. The Samba server may receive, from the shared repository, an indication of a mapping between the SID associated with the request and one or both of a UID or a GID associated with the SID. The Samba server may transmit, to the distributed file system, an indication of the file and one or both of the UID or the GID from the shared repository. Accordingly, the distributed file system may determine whether to grant the request to access the file based on comparing the UID and the GID provided by the Samba server to a set of identifiers stored in association with the file. The distributed file system may then access the file in accordance with the request.

Aspects of the computing environment 100 may be implemented to realize one or more of the following advantages. The techniques described with reference to FIG. 1 may ensure that mappings between Windows-based SIDs and Linux/Unix-based UID/GIDs are consistent across storage nodes 185 within a cluster of the DMS 110 (and potentially across clusters), thereby ensuring that unauthorized users (for example, users with insufficient privileges) are not able to inadvertently gain access to files, and that authorized users (e.g., users with sufficient privileges) are not inadvertently denied access to files due to SID/UID/GID mapping inconsistencies between storage nodes 185. The described techniques may also support greater processing efficiency and reduced storage overhead, as individual storage nodes 185 can retrieve SID/UID/GID entries from a global mapping rather than maintaining separate SID/UID/GID mappings at each storage node 185.

Figure 2:
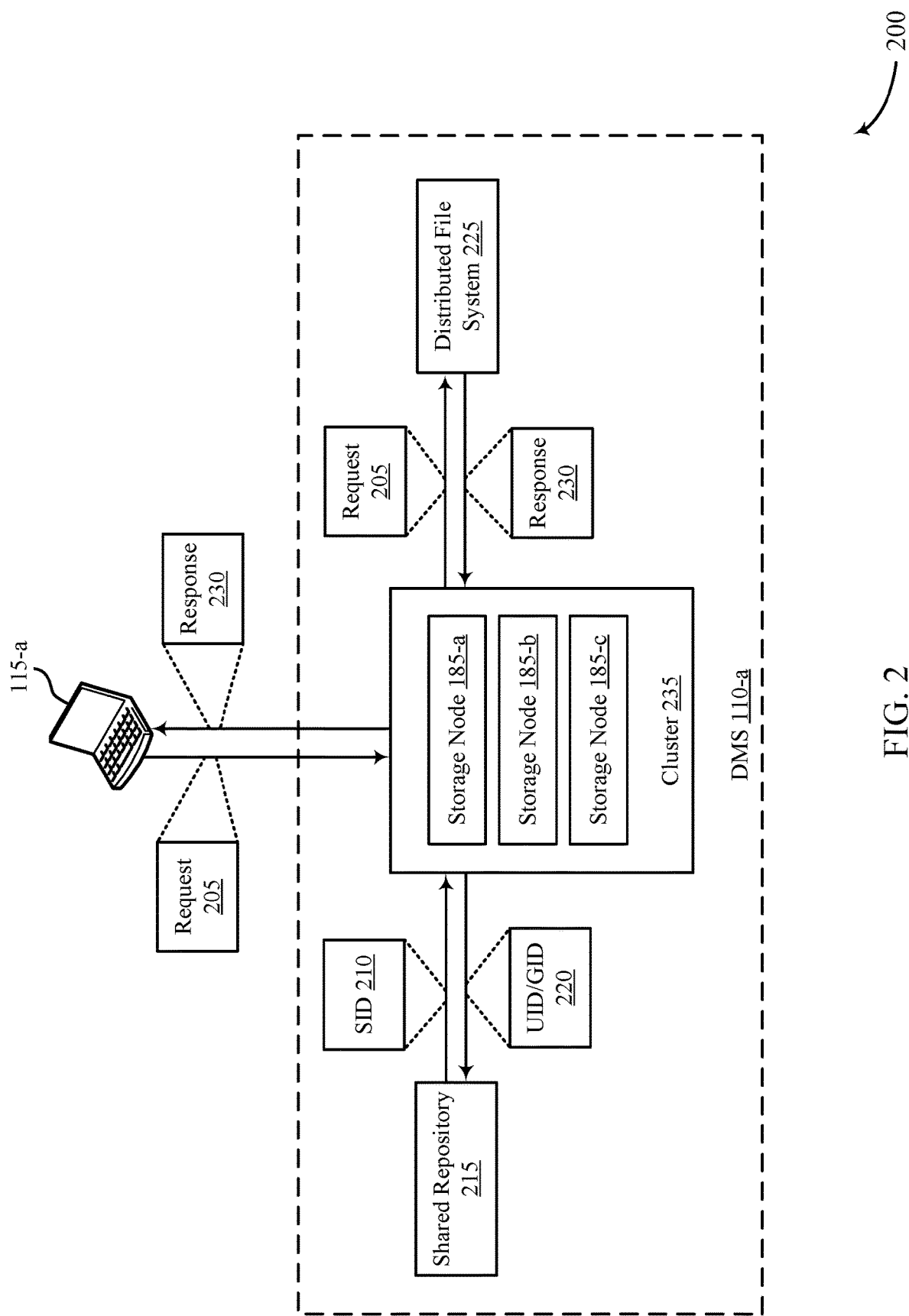

FIG. 2 illustrates an example of a computing environment 200 that supports identifier mapping techniques for cross-node consistency in accordance with aspects of the present disclosure. The computing environment 200 may implement or be implemented by aspects of the computing environment 100. For example, the computing environment 200 includes a computing device 115-a, a DMS 110-a, and a cluster 235 of storage nodes 185, which may be examples of corresponding devices described herein, including with reference to FIG. 1. The computing environment 200 also includes a shared repository 215 and a distributed file system 225, both of which may be accessible to the storage nodes 185 in the cluster 235.

As described herein, each of the storage nodes 185 in the cluster 235 (i.e., the storage node 185-a, the storage node 185-b, and the storage node 185-c) may be capable of hosting a Samba server for the purpose of exposing an SMB share to the computing device 115-a. The SMB share may be used to ingest data and/or expose snapshots to external CIFS clients (such as the computing device 115-a) for the purpose of live mount, database restoration, etc. When data is backed up using an SMB share, the computing device 115-a may write data to the SMB share. To do so, however, the Samba server may have to convert a SID 210 (such as an alphanumeric string) of a user or group associated with the computing device 115-a to a UID/GID 220 (such as an integer) that can be recognized/interpreted by the Unix-based distributed file system 225 backing the Samba server. Similarly, when the computing device 115-a reads data from the Samba server, the UID/GID 220 associated with the source file (from which the data is read) may be converted to a corresponding SID 210 of a user or group associated with the computing device 115-a (e.g., a Windows device).

In some implementations, however, each of the storage nodes 185 in the cluster 235 may have a different SID/UID/GID mapping, which can lead to access control issues. For example, the storage node 185-a may have a mapping between the SID 210 associated with the computing device 115-a (e.g., S-1-5-32-544) and a first UID/GID (e.g., 1000), while the storage node 185-b may have a mapping between the SID 210 associated with the computing device 115-a and a second UID/GID (e.g., 2000). Thus, if a user creates a file during a CIFS session between the computing device 115-a and a Samba server hosted by the storage node 185-a, the file may be associated with the UID/GID of 1000. Thereafter, if the user attempts to access the file during a CIFS session between the computing device 115-a and a Samba server hosted by the storage node 185-b, the user may be denied access because SID 210 is associated with a different UID/GID on the storage node 185-b.

Aspects of the present disclosure support techniques for ensuring that SID/UID/GID mappings are consistent across all storage nodes 185 in the cluster 235. For example, instead of maintaining a local SID/UID/GID mapping on each Samba server hosted by the storage nodes 185, a global SID/UID/GID mapping may be stored and maintained in a shared repository 215 that is accessible to and used by all of the storage nodes 185 in the cluster 235. In some implementations, the shared repository 215 may be a part of the cluster 235. In other implementations, the shared repository 215 may be managed by a centralized database system that is accessible to the cluster 235 and other clusters within the DMS 110-a. As such, the same global SID/UID/GID mapping can be used across storage nodes 185 in the cluster 235 and across clusters in the DMS 110-a.

To access the global SID/UID/GID mapping, a Samba server hosted by one of the storage nodes 185 may provide the SID 210 (which may correspond to a user or a group) associated with a the computing device 115-a to the shared repository 215. Accordingly, the shared repository 215 (or the centralized database system managing the shared repository 215) may search the global SID/UID/GID mapping to determine whether there are any existing entries for the SID 210. If the SID 210 is present in the global SID/UID/GID mapping, the shared repository 215 may pull the UID(s)/GID(s) associated with the SID and return these to the Samba server. Otherwise, the shared repository 215 may assign a new UID/GID to the SID 210, store the new UID/GID in association with the SID 210, and return the new UID/GID to the Samba server.

Accordingly, the Samba server may use the UID/GID 220 provided by the shared repository 215 to process a request 205 from the computing device 115-a, for example, by providing the request 205 and the corresponding UID/GID 220 to the distributed file system 225. Upon receiving this information from the Samba server, the distributed file system 225 may check whether the UID/GID 220 is authorized (i.e., permitted) to perform the actions indicated by the request 205 (for example, creating, updating, or deleting a file) before making the requested changes. In some examples, if the request 205 is a read call (GETATTR), the distributed file system 225 may send a read response 230 to the Samba server such that the Samba server can relay the read response 230 back to the computing device 115-a.

Aspects of the computing environment 200 may be implemented to realize one or more of the following advantages. The techniques described with reference to FIG. 2 may ensure that mappings between Windows-based SIDs and Linux/Unix-based UID/GIDs are consistent across storage nodes 185 within the cluster 235 (and potentially across clusters in the DMS 110-a), thereby ensuring that unauthorized users (e.g., users with insufficient privileges) are not able to inadvertently gain access to files, and that authorized users (e.g., users with sufficient privileges) are not inadvertently denied access to files due to mapping inconsistencies. The described techniques may also support greater processing efficiency and reduced storage overhead, as individual storage nodes 185 can retrieve SID/UID/GID entries from a global mapping stored in the shared repository 215 rather than maintaining separate SID/UID/GID mappings at each of the storage nodes 185.

Figure 3:
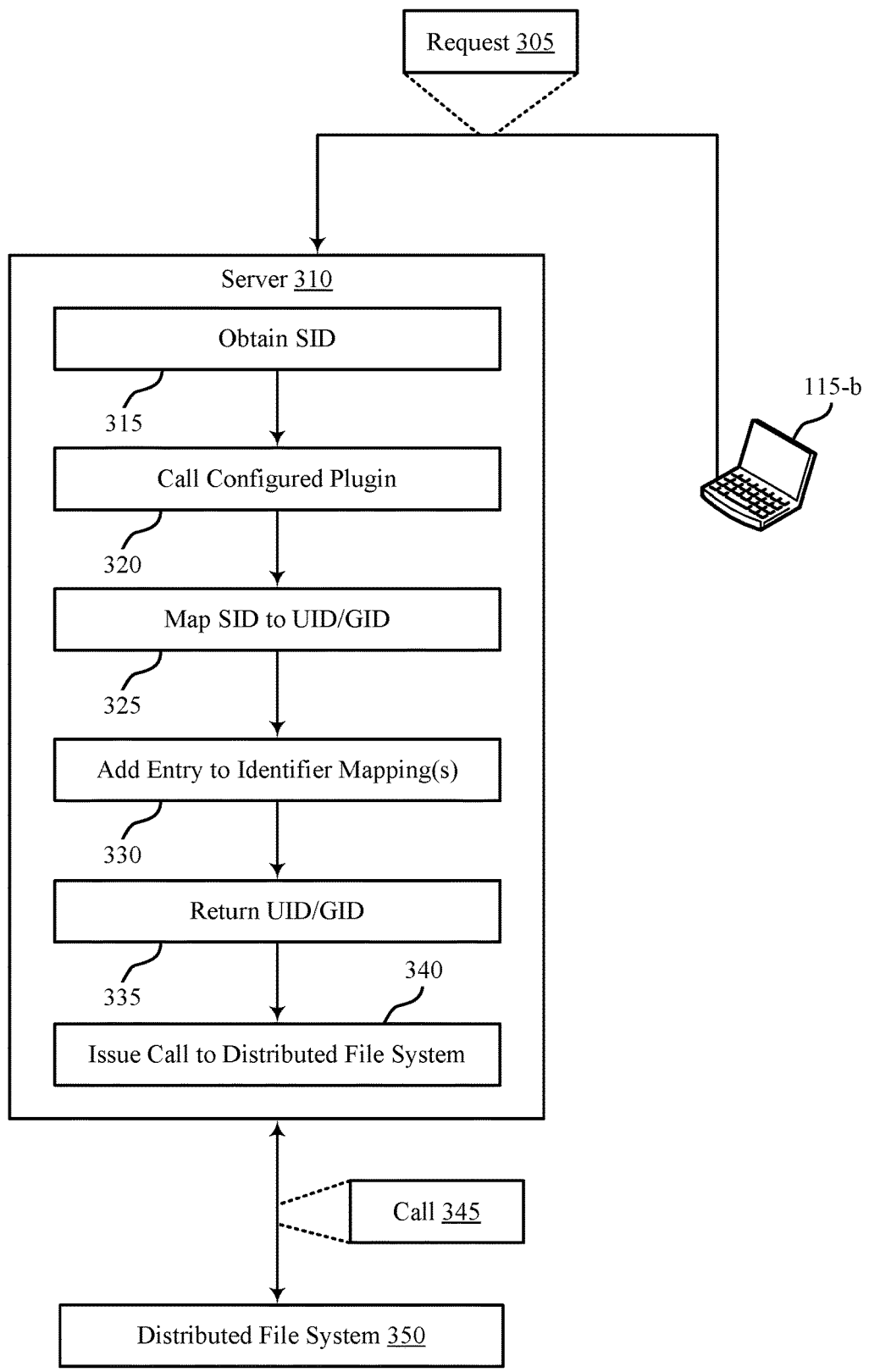
FIG. 3 illustrates an example of a system diagram that supports identifier mapping techniques for cross-node consistency in accordance with aspects of the present disclosure.

FIG. 3 illustrates an example of a system diagram 300 that supports identifier mapping techniques for cross-node consistency in accordance with aspects of the present disclosure. The system diagram 300 may implement or be implemented by aspects of the computing environment 100 or the computing environment 200. For example, the system diagram 300 includes a computing device 115-b, a server 310, and a distributed file system 350, which may be examples of corresponding devices and systems described herein, including with reference to FIGS. 1 and 2. The server 310 may be an example of a Samba server hosted by a storage node within a cluster of a DMS, such as one of the storage nodes 185 described with reference to FIGS. 1 and 2. The distributed file system 350) may be an example of a Linux or Unix-based file system.

A cluster of storage nodes (also referred to herein as a CDM cluster) may use a Samba server (i.e. the server 310) to expose an SMB share that can be used to ingest data associated with a snappable or to expose snapshot data associated with the snappable to external clients, such as the computing device 115-b. When data is backed up using the SMB share, the client (i.e., the computing device 115-b) may write data to the SMB share, and the SMB protocol may obtain or otherwise identify a SID associated with the client. If, for example, the distributed file system 350 backing the server 310 is Unix-based, this SID may be converted to a corresponding UID/GID (such as the UID/GID 220 described with reference to FIG. 2). Similarly, when data is read from the Samba server by the client, the underlying file UID/GID may be converted to a corresponding SID.

The system diagram 300 may illustrate an exemplary procedure for handling a create request within a DMS (such as the DMS 110-a described with reference to FIG. 2). As described herein, the computing device 115-b may send a request 305 to the server 310. In some implementations, the request 305 may indicate a request type (e.g., CREATE_REQ) and a file name (e.g., FileName: Foo.txt). At 315, the server 310 may get a user SID (for example, S-1-5-32-544) from a CIFS session between the computing device 115-b and the server 310. Accordingly, the server 310 may issue a request (SIDTONAME REQ: S-1-5-32-544) to a WinBind service, which may in turn call a configured plugin at 320.

At 325, the plugin may map the user SID to a corresponding UID (for example, 1000). At 330, the plugin may insert the mapping into one or more IDmap objects (for example, a SID to UID mapping and a UID to SID mapping). At 335, the plugin may return the UID (1000) to the WinBind service, which may relay the UID back to the server 310. At 340, Samba software running on the server 310 may issue a call 345 with the file name and the UID (e.g., Posix Call Create Foo.txt UID: 1000) to the distributed file system 350.

When the computing device 115-b issues a read call (GETATTR), the aforementioned procedure may occur in reverse. In other words, the server 310 gets the UID (1000) for the file (Foo.txt) from the distributed file system 350, and searches the UID to SID mapping to identify the corresponding SID. Accordingly, the SID is provided to the computing device 115-b (e.g., an SMB client) in the read response (e.g., GETATTR).

Each node in a CDM cluster can host a Samba server. Since each node has a standalone Samba server (as Samba is a non-distributed implementation), each node IdMap database may have a respective SID/UID/GID mapping. For example, on Node1, SmbUser1 could be mapped to a UID of 1000, while on Node2, SmbUser1 could be mapped to a UID of 2000. Node2 could have a different user SmbUser2 mapped to the UID of 1000. So on Node2, a Samba mount may grant access to SmbUser2, as the distributed file system 350 has the owner listed as having a UID of 1000, to which SmbUser2 is mapped on Node2. If there are inconsistent SID/UID/GID mappings across different nodes in the cluster, some users may incorrectly be denied access to files, while other users may improperly gain access to the files.

In accordance with the techniques described herein, each Samba Server (such as the server 310) hosted by a node in the cluster may contact a central database system to obtain a SID/UID/GID mapping instead of generating a local ID mapping. The central (persistent) database system may help ensure atomicity, by granting or otherwise creating a new mapping entry if the requested ID is not present. If a mapping already exists for the SID/UID/GID, the central database system may return that mapping. In some examples, the central database system may return a mapping between a SID of the user and a UID and/or a mapping between a SID of a group and a GID associated with a client.

The techniques described herein can be extended to multi-cluster CDM deployments as well (for example, by providing the same ID mapping for a replicated snapshot). Some Samba implementations may create independent SMB servers for each node without a mechanism to share configuration data. Aspects of the present disclosure may enable nodes to expose a file-system view with consistent owner and group information across different nodes within a cluster, or even to nodes in replication partner clusters.

Aspects of the system diagram 300 may be implemented to realize one or more of the following advantages. The techniques described with reference to FIG. 3 may ensure that mappings between Windows-based SIDs and Linux/Unix-based UID/GIDs are consistent across nodes within a cluster (and potentially across clusters), thereby ensuring that unauthorized users (e.g., users with insufficient privileges) are not able to inadvertently gain access to files, and that authorized users (e.g., users with sufficient privileges) are not inadvertently denied access to files due to ID mapping inconsistencies. The described techniques may also support greater processing efficiency and reduced storage overhead, as individual nodes can retrieve SID/UID/GID entries from a global mapping (stored in a shared repository) rather than maintaining separate SID/UID/GID mappings at each node.

Figure 4:
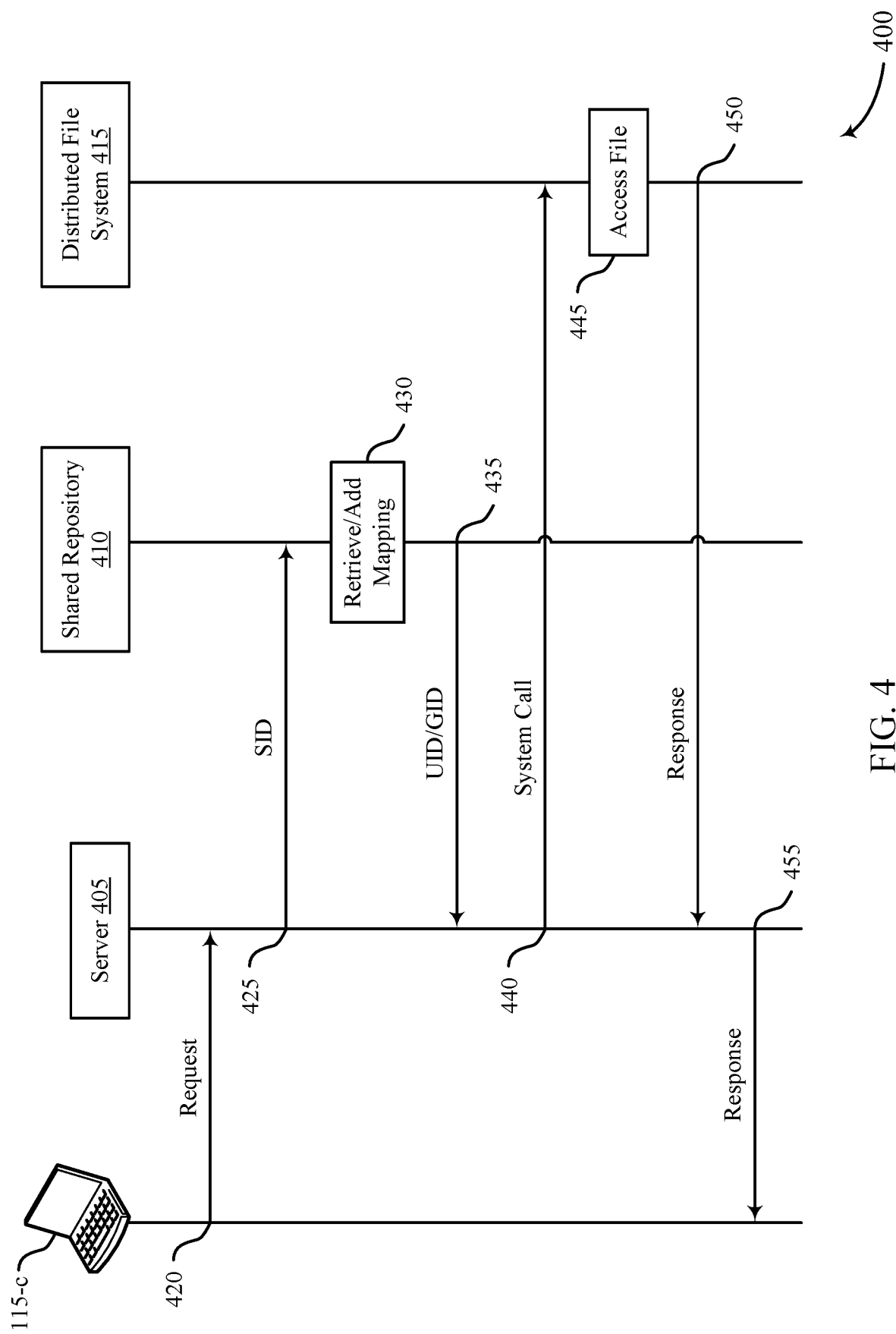
FIG. 4 illustrates an example of a process flow that supports identifier mapping techniques for cross-node consistency in accordance with aspects of the present disclosure.

FIG. 4 illustrates an example of a process flow 400 that supports identifier mapping techniques for cross-node consistency in accordance with aspects of the present disclosure. The process flow 400 may implement or be implemented by aspects of the computing environment 100, the computing environment 200, or the system diagram 300. For example, the process flow 400 includes a computing device 115-c (i.e., a CIFS client), a server 405 (i.e., a Samba server), a shared repository 410, and a distributed file system 415, which may be examples of corresponding devices and systems described herein, including with reference to FIGS. 1 through 3. In the following description of the process flow 400, operations between the computing device 115-c, the server 405, the shared repository 410, and the distributed file system 415 may be added, omitted, or performed in a different order (with respect to the exemplary order shown).

As described herein, the server 405 may be hosted by a storage node within a cluster of storage nodes in a DMS (such as the DMS 110-a described with reference to FIG. 2). Each node in the cluster may be capable of hosting a respective Samba server that is operable to communicate with the distributed file system 415 and the shared repository 410. At 420, the server 405 may receive a request to access a file stored in the distributed file system 415. The request may be associated with a SID, such as the SID 210 described with reference to FIG. 2. In some examples, the server 405 may receive the request after exposing or otherwise providing an SMB share to the computing device 115-c. The SMB share may be used to ingest snappable data from the computing device 115-c, expose snapshots of snappables to the computing device 115-c (for restore and live mount operations), etc.

At 425, the server 405 may transmit an indication of the SID associated with the request to the shared repository 410. In some examples, the SID may be a Windows-based identifier associated with a CIFS session between the server 405 and the computing device 115-c. The SID may correspond to a user, a group, or both. As described herein, the shared repository 410 may be accessible to all storage nodes in the cluster (for example, the storage nodes 185 of the cluster 235 described with reference to FIG. 2). In some examples, the shared repository 410 may be hosted by a central database system or a unified platform within the DMS.

At 430, the shared repository 410 (or a central database system managing the shared repository 410) may determine whether the SID associated with the request is present in a global SID/UID/GID mapping stored in the shared repository 410. If the SID is present in an entry of the global mapping, the shared repository 410 may retrieve the entry from the global mapping and return the entry to the server 405. Otherwise, if the SID is absent from the global mapping, the shared repository 410 may assign a new UID or GID to the SID, create a new entry in the global mapping, and add the mapping between the SID and the new UID/GID to the entry. Maintaining a global SID/UID/GID mapping at the shared repository 410 may ensure that SID/UID/GID mapping entries are consistent across all storage nodes in the cluster and, in some examples, across other clusters in the DMS.

At 435, the shared repository 410 may provide the corresponding UID/GID to the server 405. At 440, the server 405 may issue a call to the distributed file system 415. The call may include or otherwise indicate the UID/GID provided by the shared repository 410 and an identifier of the file. In some examples, the call may be a write call, a read call, or a create call, among other possible examples of requests. The server 405 may issue the call by invoking a configured plugin, as described with reference to FIG. 3.

At 445, the distributed file system 415 (e.g., a Linux or Unix-based file system) may compare the UID/GID to a list of identifiers that are authorized to access the file (if the file exists already) or by evaluating permissions associated with the UID/GID (if the file does not already exist). If the distributed file system 415 determines that an entity associated with the UID/GID is authorized to update or create the requested file, the distributed file system 415 may execute the requested operation (for example, by creating, updating, or deleting the file).

At 450, the distributed file system 415 may issue a response to the server 405. If, for example, a read call (GETATTR) is issued to the distributed file system 415, the distributed file system 415 may read and return the data specified in the read call. If a create request is issued to the distributed file system 415, the distributed file system 415 may create and store the file in accordance with the request. In such examples, the response may include a confirmation or indication that the file has been created, along with other pertinent details (file owner, creation time, document identifier). At 455, the server 405 may issue a response to the computing device 115-c. The response may indicate some or all of the information provided by the distributed file system 415.

Figure 5:
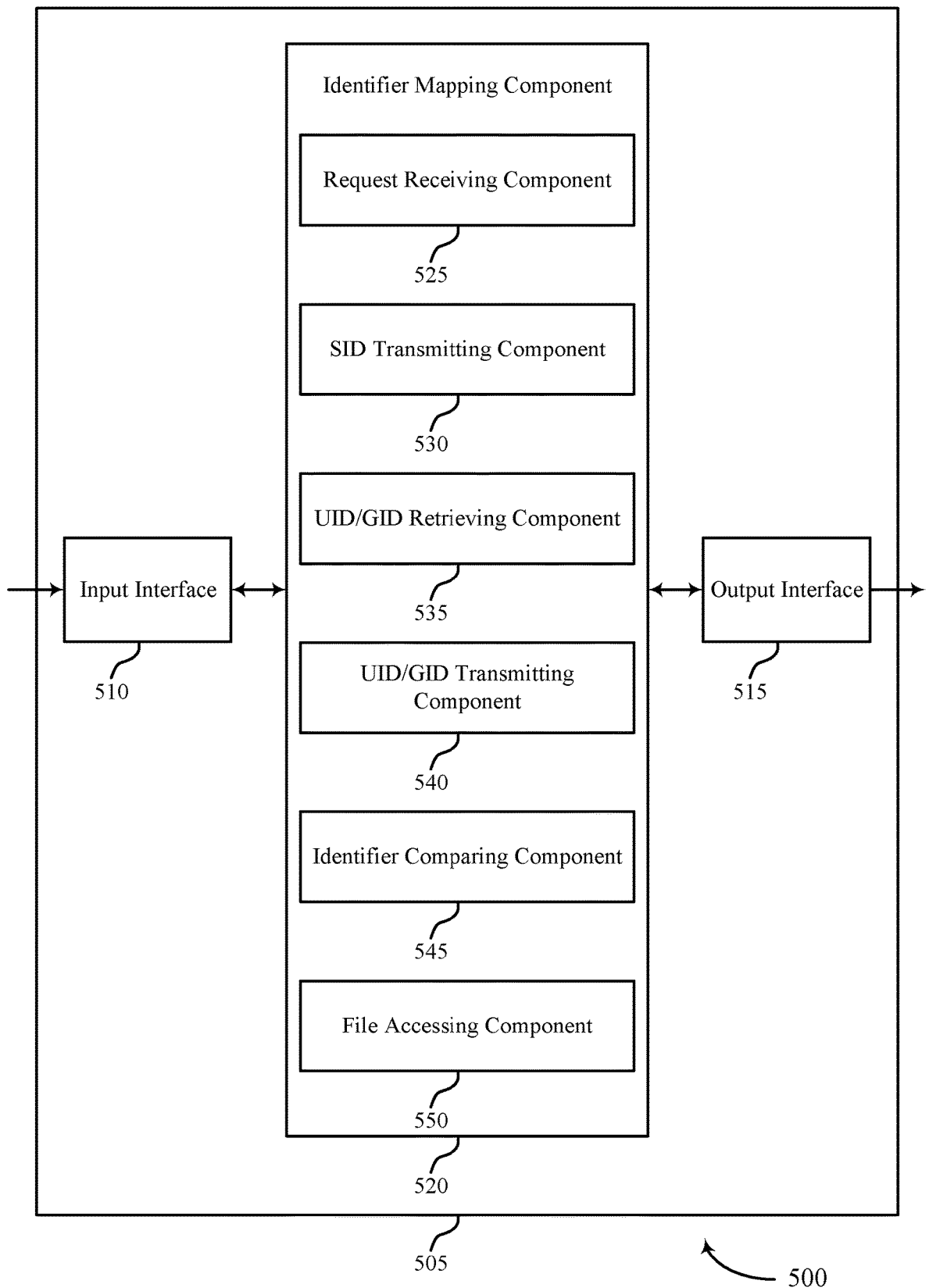
FIG. 5 illustrates a block diagram of an apparatus that supports identifier mapping techniques for cross-node consistency in accordance with aspects of the present disclosure.

FIG. 5 illustrates a block diagram 500 of a system 505 that supports identifier mapping techniques for cross-node consistency in accordance with aspects of the present disclosure. In some examples, the system 505 may be an example of aspects of one or more components described with reference to FIG. 1, such as a DMS 110. The system 505 may include an input interface 510, an output interface 515, and an identifier mapping component 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the identifier mapping component 520 to support identifier mapping techniques for cross-node consistency. In some cases, the input interface 510 may be a component of a network interface 725, as described with reference to FIG. 7.

The output interface 515 may manage output signaling for the system 505. For example, the output interface 515 may receive signaling from other components of the system 505, such as the identifier mapping component 520, and may transmit such output signaling corresponding to (e.g., representative of or otherwise based on) such signaling to other systems or devices. In some cases, the output interface 515 may be a component of a network interface 725, as described with reference to FIG. 7.

For example, the identifier mapping component 520 may include a request receiving component 525, an SID transmitting component 530, a UID/GID retrieving component 535, a UID/GID transmitting component 540, an identifier comparing component 545, a file accessing component 550, or any combination thereof. In some examples, the identifier mapping component 520, or various components thereof, may be configured to perform various operations (e.g., receiving, monitoring, transmitting) using or otherwise in cooperation with the input interface 510, the output interface 515, or both. For example, the identifier mapping component 520 may receive information from the input interface 510, send information to the output interface 515, or be integrated in combination with the input interface 510, the output interface 515, or both to receive information, transmit information, or perform various other operations as described herein.

The identifier mapping component 520 may support data management in accordance with examples disclosed herein. The request receiving component 525 may be configured as or otherwise support a means for receiving, at a server hosted by a storage node within a cluster of storage nodes in a DMS, a request to access a file stored in a distributed file system of the DMS, where the request indicates a SID associated with the request. The SID transmitting component 530 may be configured as or otherwise support a means for transmitting, from the server to a shared repository that is accessible to the storage nodes of the cluster, an indication of the SID associated with the request. The UID/GID retrieving component 535 may be configured as or otherwise support a means for receiving, at the server and from the shared repository, an indication of a mapping between the SID associated with the request and one or both of a UID or a GID associated with the SID.

The UID/GID transmitting component 540) may be configured as or otherwise support a means for transmitting, to the distributed file system, an indication of the file and one or both of the UID or the GID provided by the shared repository. The identifier comparing component 545 may be configured as or otherwise support a means for determining, by the distributed file system, whether to grant the request to access the file based on comparing the UID and the GID provided by the server to a set of identifiers stored at the distributed file system in association with the file. The file accessing component 550) may be configured as or otherwise support a means for accessing, by the distributed file system, the file in accordance with the request based on determining that one or both of the UID or the GID is includes in the set of identifiers stored at the distributed file system in association with the file.

Figure 6:
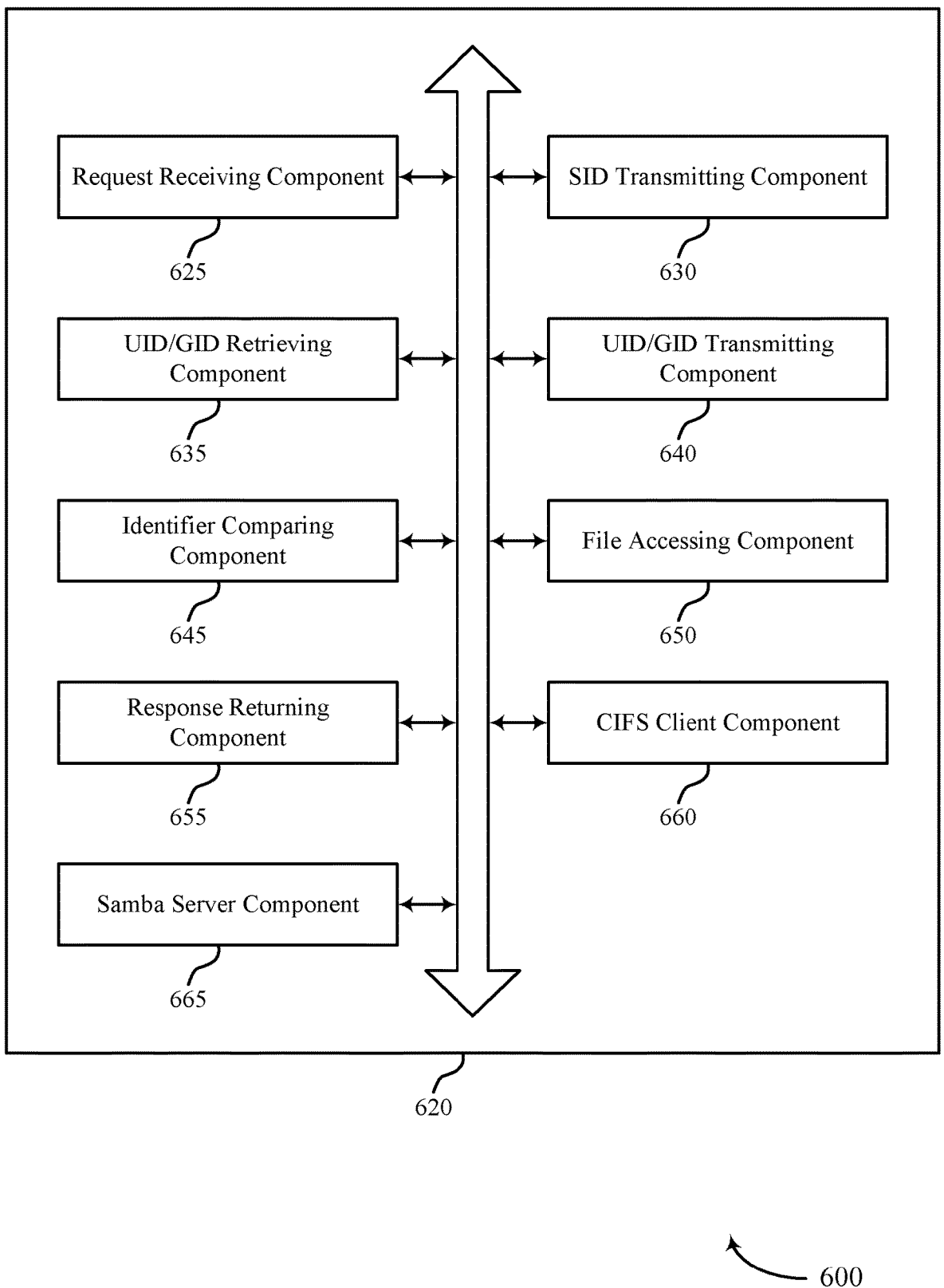
FIG. 6 illustrates a block diagram of an identifier mapping component that supports identifier mapping techniques for cross-node consistency in accordance with aspects of the present disclosure.

FIG. 6 illustrates a block diagram 600 of an identifier mapping component 620) that supports identifier mapping techniques for cross-node consistency in accordance with aspects of the present disclosure. The identifier mapping component 620 may be an example of aspects of an identifier mapping component or an identifier mapping component 520, or both, as described herein. The identifier mapping component 620, or various components thereof, may be an example of means for performing various aspects of identifier mapping techniques for cross-node consistency as described herein. For example, the identifier mapping component 620 may include a request receiving component 625, an SID transmitting component 630, a UID/GID retrieving component 635, a UID/GID transmitting component 640, an identifier comparing component 645, a file accessing component 650, a response returning component 655, an CIFS client component 660, a Samba server component 665, or any combination thereof. Each of these components may communicate, directly or indirectly, with one another (e.g., via one or more buses, communications links, communications interfaces, or any combination thereof).

The identifier mapping component 620 may support data management in accordance with examples disclosed herein. The request receiving component 625 may be configured as or otherwise support a means for receiving, at a server hosted by a storage node within a cluster of storage nodes in a DMS, a request to access a file stored in a distributed file system of the DMS, where the request indicates a SID associated with the request. The SID transmitting component 630 may be configured as or otherwise support a means for transmitting, from the server to a shared repository that is accessible to the storage nodes of the cluster, an indication of the SID associated with the request. The UID/GID retrieving component 635 may be configured as or otherwise support a means for receiving, at the server and from the shared repository, an indication of a mapping between the SID associated with the request and one or both of a UID or a GID associated with the SID.

The UID/GID transmitting component 640 may be configured as or otherwise support a means for transmitting, to the distributed file system, an indication of the file and one or both of the UID or the GID provided by the shared repository. The identifier comparing component 645 may be configured as or otherwise support a means for determining, by the distributed file system, whether to grant the request to access the file based on comparing the UID and the GID provided by the server to a set of identifiers stored at the distributed file system in association with the file. The file accessing component 650) may be configured as or otherwise support a means for accessing, by the distributed file system, the file in accordance with the request based on determining that one or both of the UID or the GID is included in the set of identifiers stored at the distributed file system in association with the file.

In some examples, the UID/GID retrieving component 635 may be configured as or otherwise support a means for adding, to the shared repository, an entry that includes the mapping between the SID associated with the request and one or both of the UID or the GID associated with the SID in response to determining that the SID associated with the request is absent from other entries of the shared repository.

In some examples, the UID/GID retrieving component 635 may be configured as or otherwise support a means for retrieving, from the shared repository, an entry that includes the mapping between the SID associated with the request and one or both of the UID or the GID associated with the SID in response to determining that the SID associated with the request is present in the shared repository.

In some examples, the request receiving component 625 may be configured as or otherwise support a means for providing, by the server hosted by the storage node, a SMB share to a client associated with the SID, where the SMB share is used to ingest snappable data from the client or to expose snapshots of snappables to the client for restore and live mount operations.

In some examples, to support accessing the file, the response returning component 655 may be configured as or otherwise support a means for returning, to a client associated with the SID, a read response that includes data from the file stored within the distributed file system.

In some examples, to support accessing the file, the file accessing component 650 may be configured as or otherwise support a means for creating and storing the file at the distributed file system in accordance with the request, where the file is stored in association with the UID and the GID.

In some examples, the SID associated with the request is obtained from a CIFS session between the server and a client associated with the SID. In some examples, each node in the cluster hosts a respective Samba server that is operable to communicate with the distributed file system and the shared repository.

In some examples, the mapping between the SID associated with the request and one or both of the UID or the GID associated with the SID is consistent across all the storage nodes in the cluster based on the shared repository being accessible to all the storage nodes within the cluster.

In some examples, the mapping between the SID associated with the request and one or both of the UID or the GID associated with the SID is consistent across multiple clusters of storage nodes within the DMS based on the shared repository being accessible to all the storage nodes within the multiple clusters.

In some examples, the shared repository is hosted by a central database system within the DMS. In some examples, the request is associated with a CIFS client of the DMS. In some examples, the server hosted by the storage node includes a Samba server.

In some examples, the SID associated with the request is associated with a Windows operating system. In some examples, the UID and the GID associated with the SID are associated with a Linux operating system. In some examples, the distributed file system includes a Linux or Unix-based file system.

Figure 7:
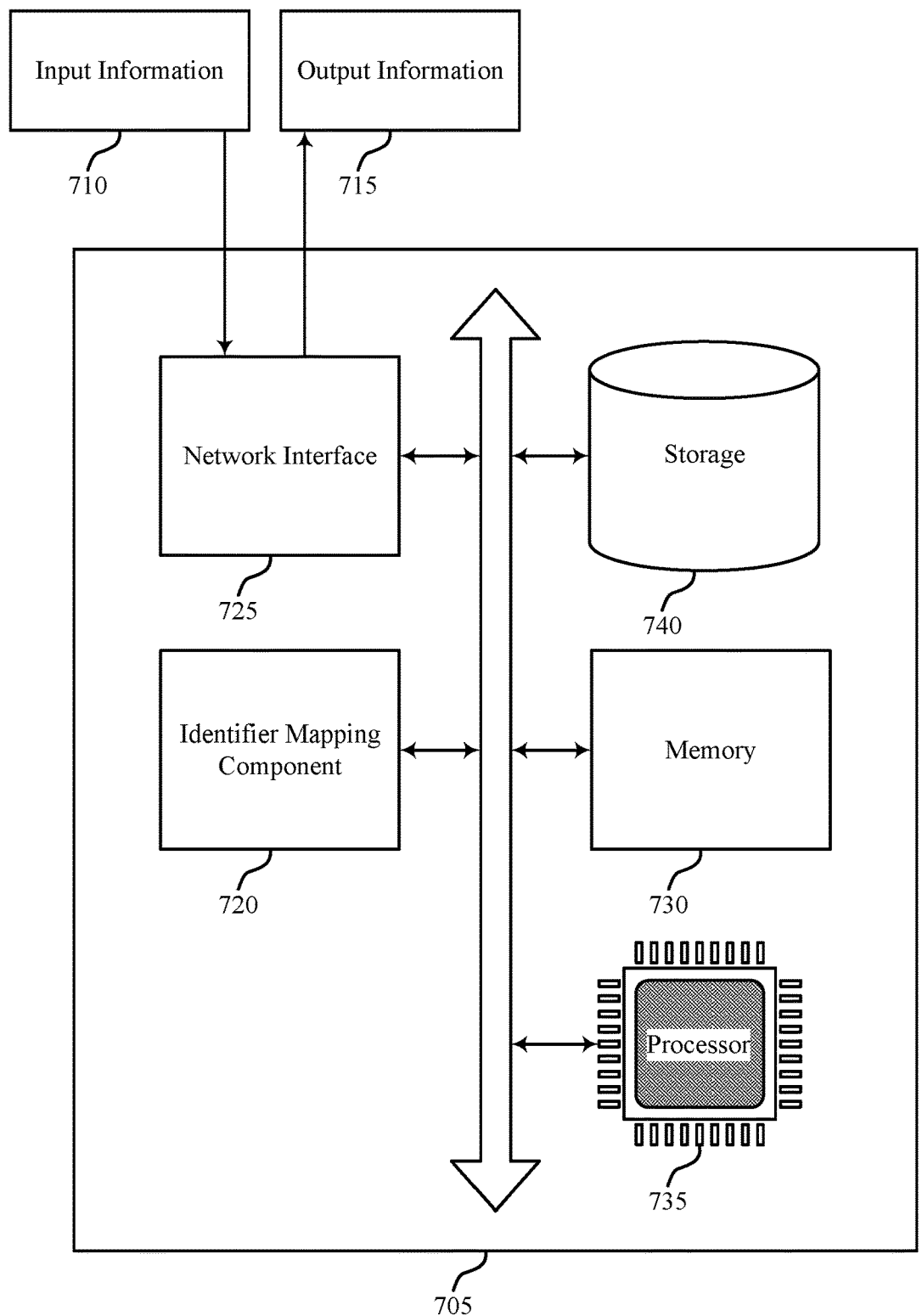
FIG. 7 illustrates a diagram of a system including a device that supports identifier mapping techniques for cross-node consistency in accordance with aspects of the present disclosure.

FIG. 7 illustrates a block diagram 700 of a system 705 that supports identifier mapping techniques for cross-node consistency in accordance with aspects of the present disclosure. The system 705 may be an example of or include the components of a system 505 as described herein. The system 705 may include components for data management, including components such as an identifier mapping component 720, an input information 710, an output information 715, a network interface 725, a memory 730, a processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting identifier mapping techniques for cross-node consistency). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740) may be an example of a single database, a distributed database, multiple distributed databases, a data store, a data lake, or an emergency backup database. In some examples, the storage 740) may be an example of one or more components described with reference to FIG. 1, such as one or more network disks 180.

The identifier mapping component 720 may support data management in accordance with examples disclosed herein. For example, the identifier mapping component 720 may be configured as or otherwise support a means for receiving, at a server hosted by a storage node within a cluster of storage nodes in a DMS, a request to access a file stored in a distributed file system of the DMS, where the request indicates a SID associated with the request. The identifier mapping component 720 may be configured as or otherwise support a means for transmitting, from the server to a shared repository that is accessible to the storage nodes of the cluster, an indication of the SID associated with the request. The identifier mapping component 720 may be configured as or otherwise support a means for receiving, at the server and from the shared repository, an indication of a mapping between the SID associated with the request and one or both of a UID or a GID associated with the SID.

The identifier mapping component 720 may be configured as or otherwise support a means for transmitting, to the distributed file system, an indication of the file and one or both of the UID or the GID provided by the shared repository. The identifier mapping component 720 may be configured as or otherwise support a means for determining, by the distributed file system, whether to grant the request to access the file based on comparing the UID and the GID provided by the server to a set of identifiers stored at the distributed file system in association with the file. The identifier mapping component 720 may be configured as or otherwise support a means for accessing, by the distributed file system, the file in accordance with the request based on determining that one or both of the UID or the GID is included in the set of identifiers stored at the distributed file system in association with the file.

By including or configuring the identifier mapping component 720 in accordance with examples as described herein, the system 705 may support techniques for identifier mapping techniques for cross-node consistency, which may provide one or more benefits such as, for example, fewer access control issues, greater consistency, and improved user experience, among other possibilities.

Figure 8:
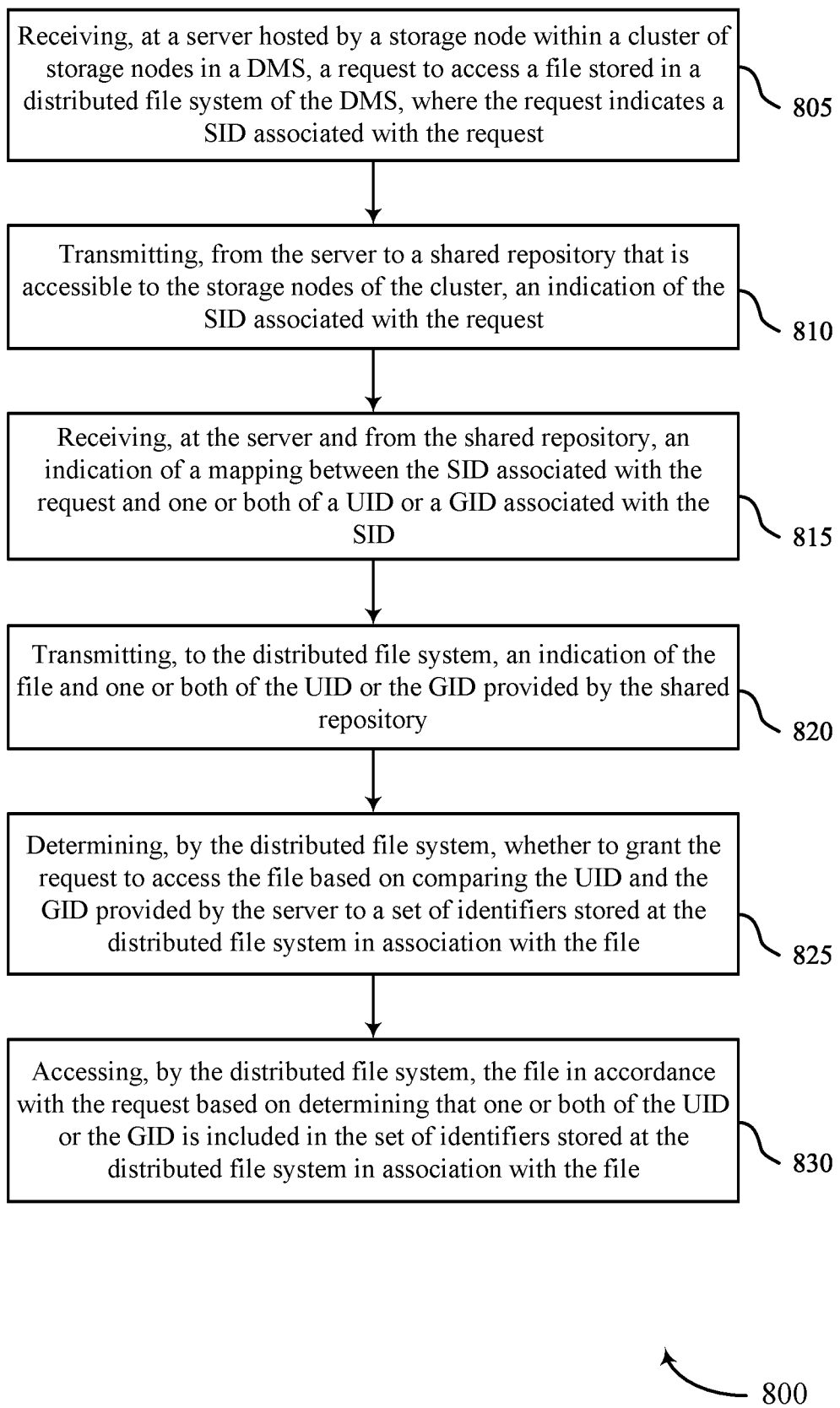
FIGS. 8 through 10 illustrate flowcharts showing methods that support identifier mapping techniques for cross-node consistency in accordance with aspects of the present disclosure.

FIG. 8 illustrates a flowchart showing a method 800 that supports identifier mapping techniques for cross-node consistency in accordance with aspects of the present disclosure. The operations of the method 800 may be implemented by a DMS or components thereof. For example, the operations of the method 800 may be performed by a DMS 110, as described with reference to FIGS. 1 through 7. In some examples, the DMS may execute a set of instructions to control the functional elements of the DMS to perform the described functions. Additionally, or alternatively, the DMS may perform aspects of the described functions using special-purpose hardware.

At 805, the method may include receiving, at a server hosted by a storage node within a cluster of storage nodes in a DMS, a request to access a file stored in a distributed file system of the DMS, where the request indicates a SID associated with the request. The operations of 805 may be performed in accordance with examples disclosed herein. In some examples, aspects of the operations of 805 may be performed by a request receiving component 625, as described with reference to FIG. 6.

At 810, the method may include transmitting, from the server to a shared repository that is accessible to the storage nodes of the cluster, an indication of the SID associated with the request. The operations of 810 may be performed in accordance with examples disclosed herein. In some examples, aspects of the operations of 810 may be performed by an SID transmitting component 630, as described with reference to FIG. 6.

At 815, the method may include receiving, at the server and from the shared repository, an indication of a mapping between the SID associated with the request and one or both of a UID or a GID associated with the SID. The operations of 815 may be performed in accordance with examples disclosed herein. In some examples, aspects of the operations of 815 may be performed by a UID/GID retrieving component 635, as described with reference to FIG. 6.

At 820, the method may include transmitting, to the distributed file system, an indication of the file and one or both of the UID or the GID provided by the shared repository. The operations of 820 may be performed in accordance with examples disclosed herein. In some examples, aspects of the operations of 820 may be performed by a UID/GID transmitting component 640, as described with reference to FIG. 6.

At 825, the method may include determining, by the distributed file system, whether to grant the request to access the file based on comparing the UID and the GID provided by the server to a set of identifiers stored at the distributed file system in association with the file. The operations of 825 may be performed in accordance with examples disclosed herein. In some examples, aspects of the operations of 825 may be performed by an identifier comparing component 645, as described with reference to FIG. 6.

At 830, the method may include accessing, by the distributed file system, the file in accordance with the request based on determining that one or both of the UID or the GID is included in the set of identifiers stored at the distributed file system in association with the file. The operations of 830 may be performed in accordance with examples disclosed herein. In some examples, aspects of the operations of 830 may be performed by a file accessing component 650, as described with reference to FIG. 6.

Figure 9:
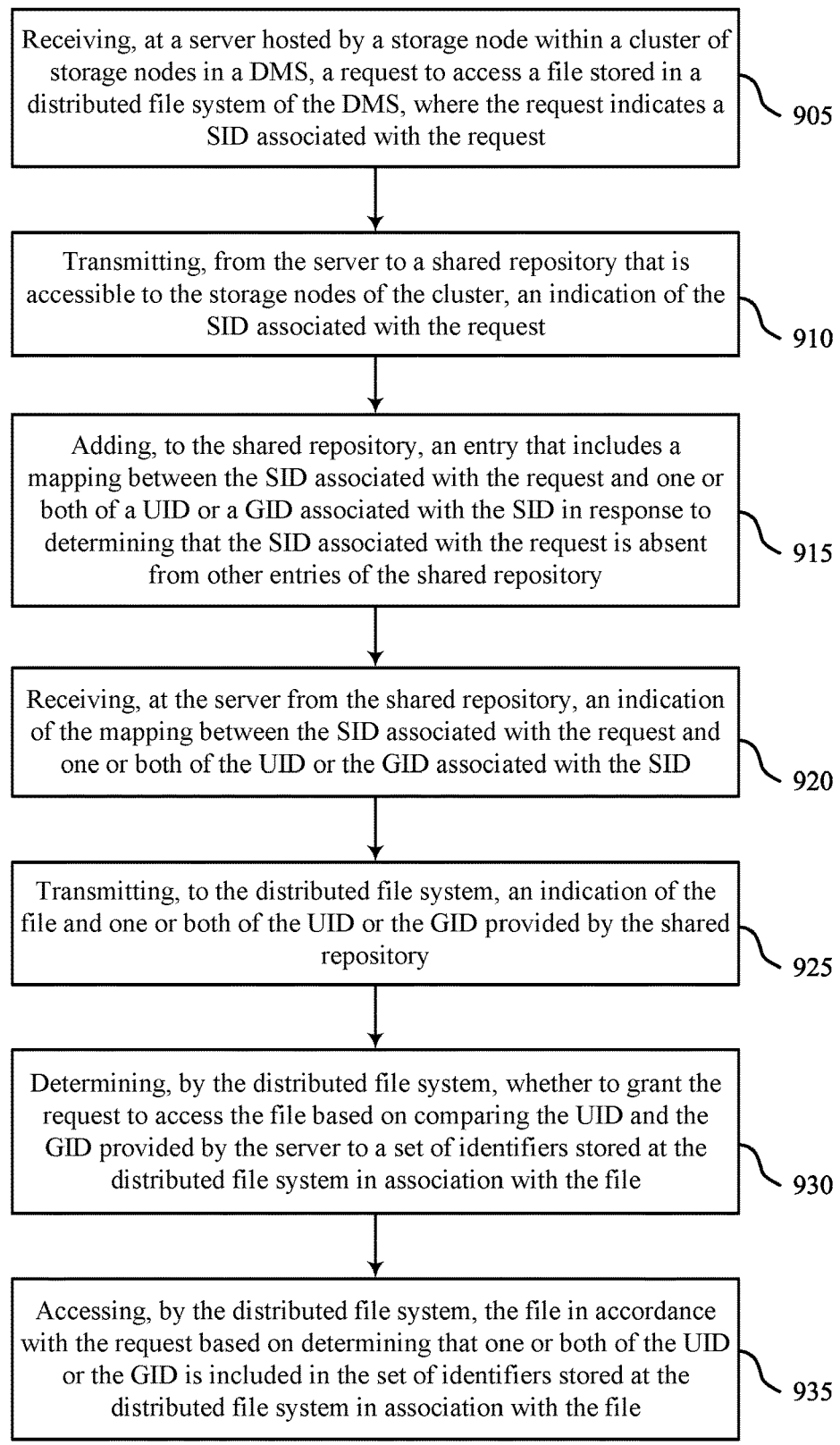

FIG. 9 illustrates a flowchart showing a method 900 that supports identifier mapping techniques for cross-node consistency in accordance with aspects of the present disclosure. The operations of the method 900 may be implemented by a DMS or components thereof. For example, the operations of the method 900 may be performed by a DMS 110, as described with reference to FIGS. 1 through 7. In some examples, the DMS may execute a set of instructions to control the functional elements of the DMS to perform the described functions. Additionally, or alternatively, the DMS may perform aspects of the described functions using special-purpose hardware.

At 905, the method may include receiving, at a server hosted by a storage node within a cluster of storage nodes in a DMS, a request to access a file stored in a distributed file system of the DMS, where the request indicates a SID associated with the request. The operations of 905 may be performed in accordance with examples disclosed herein. In some examples, aspects of the operations of 905 may be performed by a request receiving component 625, as described with reference to FIG. 6.

At 910, the method may include transmitting, from the server to a shared repository that is accessible to the storage nodes of the cluster, an indication of the SID associated with the request. The operations of 910 may be performed in accordance with examples disclosed herein. In some examples, aspects of the operations of 910 may be performed by an SID transmitting component 630, as described with reference to FIG. 6.

At 915, the method may include adding, to the shared repository, an entry that includes a mapping between the SID associated with the request and one or both of a UID or a GID associated with the SID in response to determining that the SID associated with the request is absent from other entries of the shared repository. The operations of 915 may be performed in accordance with examples disclosed herein. In some examples, aspects of the operations of 915 may be performed by a UID/GID retrieving component 635, as described with reference to FIG. 6.

At 920, the method may include receiving, at the server from the shared repository, an indication of the mapping between the SID associated with the request and one or both of the UID or the GID associated with the SID. The operations of 920 may be performed in accordance with examples disclosed herein. In some examples, aspects of the operations of 920 may be performed by a UID/GID retrieving component 635, as described with reference to FIG. 6.

At 925, the method may include transmitting, to the distributed file system, an indication of the file and one or both of the UID or the GID provided by the shared repository. The operations of 925 may be performed in accordance with examples disclosed herein. In some examples, aspects of the operations of 925 may be performed by a UID/GID transmitting component 640, as described with reference to FIG. 6.

At 930, the method may include determining, by the distributed file system, whether to grant the request to access the file based on comparing the UID and the GID provided by the server to a set of identifiers stored at the distributed file system in association with the file. The operations of 930 may be performed in accordance with examples disclosed herein. In some examples, aspects of the operations of 930 may be performed by an identifier comparing component 645, as described with reference to FIG. 6.

At 935, the method may include accessing, by the distributed file system, the file in accordance with the request based on determining that one or both of the UID or the GID is included in the set of identifiers stored at the distributed file system in association with the file. The operations of 935 may be performed in accordance with examples disclosed herein. In some examples, aspects of the operations of 935 may be performed by a file accessing component 650, as described with reference to FIG. 6.

Figure 10:
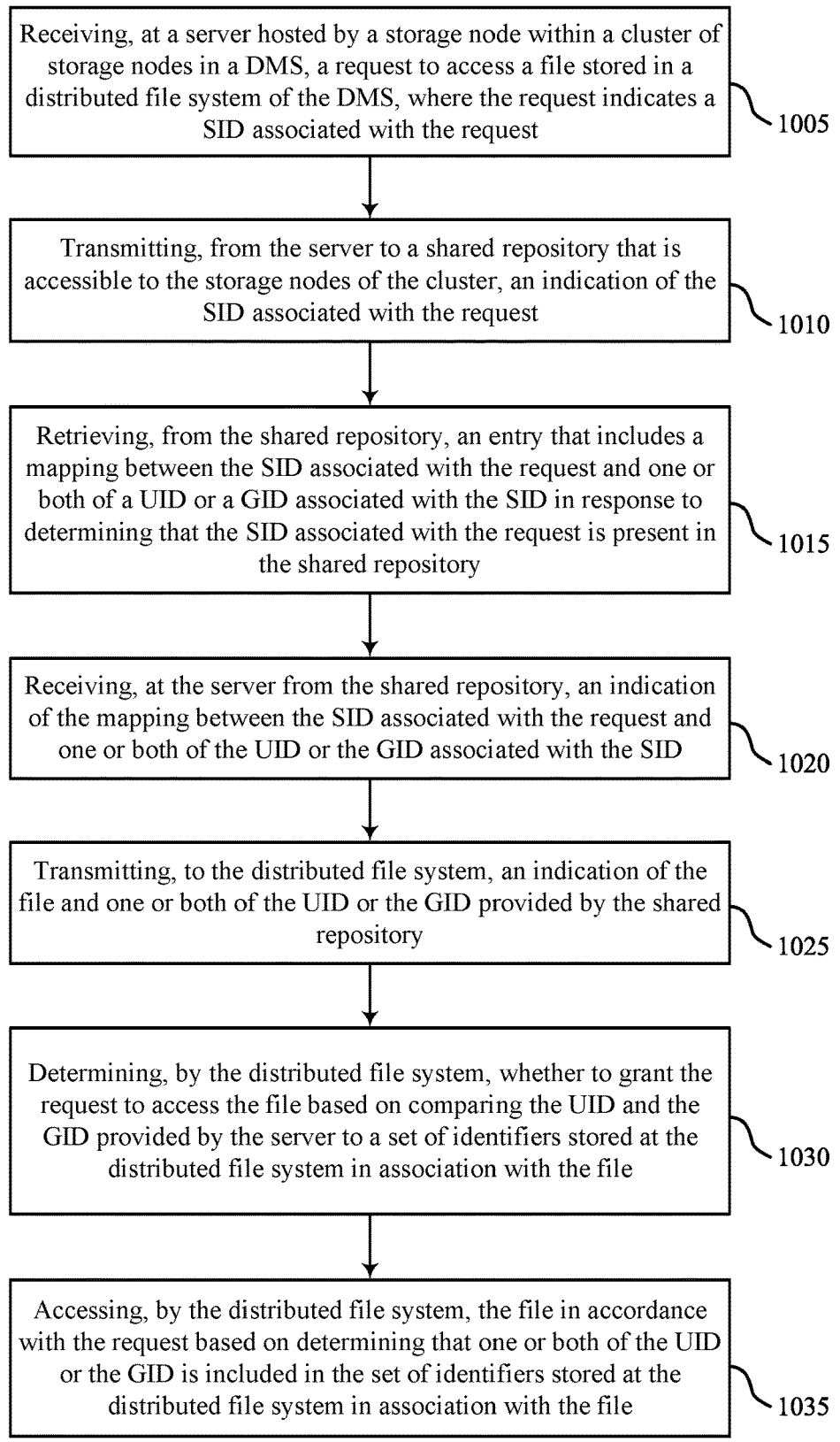

FIG. 10 illustrates a flowchart showing a method 1000 that supports identifier mapping techniques for cross-node consistency in accordance with aspects of the present disclosure. The operations of the method 1000 may be implemented by a DMS or components thereof. For example, the operations of the method 1000 may be performed by a DMS 110, as described with reference to FIGS. 1 through 7. In some examples, the DMS may execute a set of instructions to control the functional elements of the DMS to perform the described functions. Additionally, or alternatively, the DMS may perform aspects of the described functions using special-purpose hardware.

At 1005, the method may include receiving, at a server hosted by a storage node within a cluster of storage nodes in a DMS, a request to access a file stored in a distributed file system of the DMS, where the request indicates a SID associated with the request. The operations of 1005 may be performed in accordance with examples disclosed herein. In some examples, aspects of the operations of 1005 may be performed by a request receiving component 625, as described with reference to FIG. 6.

At 1010, the method may include transmitting, from the server to a shared repository that is accessible to the storage nodes of the cluster, an indication of the SID associated with the request. The operations of 1010 may be performed in accordance with examples disclosed herein. In some examples, aspects of the operations of 1010 may be performed by an SID transmitting component 630, as described with reference to FIG. 6.

At 1015, the method may include retrieving, from the shared repository, an entry that includes a mapping between the SID associated with the request and one or both of a UID or a GID associated with the SID in response to determining that the SID associated with the request is present in the shared repository. The operations of 1015 may be performed in accordance with examples disclosed herein. In some examples, aspects of the operations of 1015 may be performed by a UID/GID retrieving component 635, as described with reference to FIG. 6.

At 1020, the method may include receiving, at the server from the shared repository, an indication of the mapping between the SID associated with the request and one or both of the UID or the GID associated with the SID. The operations of 1020 may be performed in accordance with examples disclosed herein. In some examples, aspects of the operations of 1020 may be performed by a UID/GID retrieving component 635, as described with reference to FIG. 6.

At 1025, the method may include transmitting, to the distributed file system, an indication of the file and one or both of the UID or the GID provided by the shared repository. The operations of 1025 may be performed in accordance with examples disclosed herein. In some examples, aspects of the operations of 1025 may be performed by a UID/GID transmitting component 640), as described with reference to FIG. 6.

At 1030, the method may include determining, by the distributed file system, whether to grant the request to access the file based on comparing the UID and the GID provided by the server to a set of identifiers stored at the distributed file system in association with the file. The operations of 1030 may be performed in accordance with examples disclosed herein. In some examples, aspects of the operations of 1030 may be performed by an identifier comparing component 645, as described with reference to FIG. 6.

At 1035, the method may include accessing, by the distributed file system, the file in accordance with the request based on determining that one or both of the UID or the GID is included in the set of identifiers stored at the distributed file system in association with the file. The operations of 1035 may be performed in accordance with examples disclosed herein. In some examples, aspects of the operations of 1035 may be performed by a file accessing component 650, as described with reference to FIG. 6.

A method for data management is described. The method may include: receiving, at a server hosted by a storage node within a cluster of storage nodes in a DMS, a request to access a file stored in a distributed file system of the DMS, where the request indicates a SID associated with the request: transmitting, from the server to a shared repository that is accessible to the storage nodes of the cluster, an indication of the SID associated with the request: receiving, at the server and from the shared repository, an indication of a mapping between the SID associated with the request and one or both of a UID or a GID associated with the SID: transmitting, to the distributed file system, an indication of the file and one or both of the UID or the GID provided by the shared repository: determining, by the distributed file system, whether to grant the request to access the file based on comparing the UID and the GID provided by the server to a set of identifiers stored at the distributed file system in association with the file: and accessing, by the distributed file system, the file in accordance with the request based on determining that one or both of the UID or the GID is included in the set of identifiers stored at the distributed file system in association with the file.

An apparatus for data management is described. The apparatus may include a processor, memory coupled with the processor, and instructions stored in the memory. The instructions may be executable by the processor to cause the apparatus to: receive, at a server hosted by a storage node within a cluster of storage nodes in a DMS, a request to access a file stored in a distributed file system of the DMS, where the request indicates a SID associated with the request: transmit, from the server to a shared repository that is accessible to the storage nodes of the cluster, an indication of the SID associated with the request: receive, at the server and from the shared repository, an indication of a mapping between the SID associated with the request and one or both of a UID or a GID associated with the SID; transmit, to the distributed file system, an indication of the file and one or both of the UID or the GID provided by the shared repository: determine, by the distributed file system, whether to grant the request to access the file based on comparing the UID and the GID provided by the server to a set of identifiers stored at the distributed file system in association with the file: and access, by the distributed file system, the file in accordance with the request based on determining that one or both of the UID or the GID is included in the set of identifiers stored at the distributed file system in association with the file.

Another apparatus for data management is described. The apparatus may include: means for receiving, at a server hosted by a storage node within a cluster of storage nodes in a DMS, a request to access a file stored in a distributed file system of the DMS, where the request indicates a SID associated with the request: means for transmitting, from the server to a shared repository that is accessible to the storage nodes of the cluster, an indication of the SID associated with the request: means for receiving, at the server and from the shared repository, an indication of a mapping between the SID associated with the request and one or both of a UID or a GID associated with the SID; means for transmitting, to the distributed file system, an indication of the file and one or both of the UID or the GID provided by the shared repository: means for determining, by the distributed file system, whether to grant the request to access the file based on comparing the UID and the GID provided by the server to a set of identifiers stored at the distributed file system in association with the file: and means for accessing, by the distributed file system, the file in accordance with the request based on determining that one or both of the UID or the GID is included in the set of identifiers stored at the distributed file system in association with the file.

A non-transitory computer-readable medium storing code for data management is described. The code may include instructions executable by a processor to: receive, at a server hosted by a storage node within a cluster of storage nodes in a DMS, a request to access a file stored in a distributed file system of the DMS, where the request indicates a SID associated with the request: transmit, from the server to a shared repository that is accessible to the storage nodes of the cluster, an indication of the SID associated with the request; receive, at the server and from the shared repository, an indication of a mapping between the SID associated with the request and one or both of a UID or a GID associated with the SID; transmit, to the distributed file system, an indication of the file and one or both of the UID or the GID provided by the shared repository: determine, by the distributed file system, whether to grant the request to access the file based on comparing the UID and the GID provided by the server to a set of identifiers stored at the distributed file system in association with the file: and access, by the distributed file system, the file in accordance with the request based on determining that one or both of the UID or the GID is included in the set of identifiers stored at the distributed file system in association with the file.

Some examples of the methods, apparatuses, and non-transitory computer-readable media described herein may further include operations, features, means, or instructions for adding, to the shared repository, an entry that includes the mapping between the SID associated with the request and one or both of the UID or the GID associated with the SID in response to determining that the SID associated with the request is absent from other entries of the shared repository.

Some examples of the methods, apparatuses, and non-transitory computer-readable media described herein may further include operations, features, means, or instructions for retrieving, from the shared repository, an entry that includes the mapping between the SID associated with the request and one or both of the UID or the GID associated with the SID in response to determining that the SID associated with the request is present in the shared repository.

Some examples of the methods, apparatuses, and non-transitory computer-readable media described herein may further include operations, features, means, or instructions for providing, by the server hosted by the storage node, a SMB share to a client associated with the SID, where the SMB share is used to ingest snappable data from the client or to expose snapshots of snappables to the client for restore and live mount operations.

In some examples of the methods, apparatuses, and non-transitory computer-readable media described herein, operations, features, means, or instructions for accessing the file may include operations, features, means, or instructions for returning, to a client associated with the SID, a read response that includes data from the file stored within the distributed file system.

In some examples of the methods, apparatuses, and non-transitory computer-readable media described herein, operations, features, means, or instructions for accessing the file may include operations, features, means, or instructions for creating and storing the file at the distributed file system in accordance with the request, where the file is stored in association with the UID and the GID.

In some examples of the methods, apparatuses, and non-transitory computer-readable media described herein, the SID associated with the request may be obtained from a CIFS session between the server and a client associated with the SID.

In some examples of the methods, apparatuses, and non-transitory computer-readable media described herein, each node in the cluster hosts a respective Samba server that is operable to communicate with the distributed file system and the shared repository.

In some examples of the methods, apparatuses, and non-transitory computer-readable media described herein, the mapping between the SID associated with the request and one or both of the UID or the GID associated with the SID may be consistent across all the storage nodes in the cluster based on the shared repository being accessible to all the storage nodes within the cluster.

In some examples of the methods, apparatuses, and non-transitory computer-readable media described herein, the mapping between the SID associated with the request and one or both of the UID or the GID associated with the SID may be consistent across multiple clusters of storage nodes within the DMS based on the shared repository being accessible to all the storage nodes within the multiple clusters.

In some examples of the methods, apparatuses, and non-transitory computer-readable media described herein, the shared repository may be hosted by a central database system within the DMS.

In some examples of the methods, apparatuses, and non-transitory computer-readable media described herein, the request may be associated with a CIFS client of the DMS, and the server hosted by the storage node includes a Samba server.

In some examples of the methods, apparatuses, and non-transitory computer-readable media described herein, the SID associated with the request may be associated with a Windows operating system, and the UID and the GID associated with the SID may be associated with a Linux operating system.

In some examples of the methods, apparatuses, and non-transitory computer-readable media described herein, the distributed file system includes a Linux or Unix-based file system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
receiving, at a server hosted by a storage node within a cluster of storage nodes in a data management system (DMS), a request to access a file stored in a distributed file system of the DMS, wherein the request indicates a security identifier (SID) associated with the request;
transmitting, from the server to a shared repository that is accessible to the storage nodes within the cluster, an indication of the SID associated with the request;
receiving, at the server and from the shared repository, an indication of a mapping between the SID associated with the request and one or both of a user identifier (UID) or a group identifier (GID) associated with the SID;
transmitting, to the distributed file system, an indication of the file and one or both of the UID or the GID provided by the shared repository;
determining, by the distributed file system, whether to grant the request to access the file based at least in part on comparing the UID and the GID provided by the server to a set of identifiers stored at the distributed file system in association with the file; and accessing, by the distributed file system, the file in accordance with the request based at least in part on determining that one or both of the UID or the GID is included in the set of identifiers stored at the distributed file system in association with the file.

2. The method of claim 1, further comprising:
adding, to the shared repository, an entry that includes the mapping between the SID associated with the request and one or both of the UID or the GID associated with the SID in response to determining that the SID associated with the request is absent from other entries of the shared repository.

3. The method of claim 1, further comprising:
retrieving, from the shared repository, an entry that includes the mapping between the SID associated with the request and one or both of the UID or the GID associated with the SID in response to determining that the SID associated with the request is present in the shared repository.

4. The method of claim 1, further comprising:
providing, by the server hosted by the storage node, a server message block (SMB) share to a client associated with the SID, wherein the SMB share is used to ingest snappable data from the client or to expose snapshots of snappables to the client for restore and live mount operations.

5. The method of claim 1, wherein accessing the file comprises:
returning, to a client associated with the SID, a read response that includes data from the file stored within the distributed file system.

6. The method of claim 1, wherein accessing the file comprises:
creating and storing the file at the distributed file system in accordance with the request, wherein the file is stored in association with the UID and the GID.

7. The method of claim 1, wherein the SID associated with the request is obtained from a Common Internet File System (CIFS) session between the server and a client associated with the SID.

8. The method of claim 1, wherein each node within the cluster hosts a respective Samba server that is operable to communicate with the distributed file system and the shared repository.

9. The method of claim 1, wherein the mapping between the SID associated with the request and one or both of the UID or the GID associated with the SID is consistent across all the storage nodes within the cluster based at least in part on the shared repository being accessible to all the storage nodes within the cluster.

10. The method of claim 1, wherein the mapping between the SID associated with the request and one or both of the UID or the GID associated with the SID is consistent across multiple clusters of storage nodes within the DMS based at least in part on the shared repository being accessible to all the storage nodes within the multiple clusters.

11. The method of claim 1, wherein the shared repository is hosted by a central database system within the DMS.

12. The method of claim 1, wherein:
the request is associated with a Common Internet File System (CIFS) client of the DMS; and
the server hosted by the storage node comprises a Samba server.

13. The method of claim 1, wherein:
the SID associated with the request is associated with a Windows operating system; and
the UID and the GID associated with the SID are associated with a Linux operating system.

14. The method of claim 1, wherein the distributed file system comprises a Linux or Unix-based file system.

15. An apparatus for data management, comprising:
a processor;
memory coupled with the processor; and
instructions stored in the memory and executable by the processor to cause the apparatus to:
receive, at a server hosted by a storage node within a cluster of storage nodes in a data management system (DMS), a request to access a file stored in a distributed file system of the DMS, wherein the request indicates a security identifier (SID) associated with the request;
transmit, from the server to a shared repository that is accessible to the storage nodes within the cluster, an indication of the SID associated with the request;
receive, at the server and from the shared repository, an indication of a mapping between the SID associated with the request and one or both of a user identifier (UID) or a group identifier (GID) associated with the SID;
transmit, to the distributed file system, an indication of the file and one or both of the UID or the GID provided by the shared repository;
determine, by the distributed file system, whether to grant the request to access the file based at least in part on comparing the UID and the GID provided by the server to a set of identifiers stored at the distributed file system in association with the file; and
access, by the distributed file system, the file in accordance with the request based at least in part on determining that one or both of the UID or the GID is included in the set of identifiers stored at the distributed file system in association with the file.

16. The apparatus of claim 15, wherein the instructions are further executable by the processor to cause the apparatus to:
add, to the shared repository, an entry that includes the mapping between the SID associated with the request and one or both of the UID or the GID associated with the SID in response to determining that the SID associated with the request is absent from other entries of the shared repository.

17. The apparatus of claim 15, wherein the instructions are further executable by the processor to cause the apparatus to:
retrieve, from the shared repository, an entry that includes the mapping between the SID associated with the request and one or both of the UID or the GID associated with the SID in response to determining that the SID associated with the request is present in the shared repository.

18. The apparatus of claim 15, wherein the instructions are further executable by the processor to cause the apparatus to:
provide, by the server hosted by the storage node, a server message block (SMB) share to a client associated with the SID, wherein the SMB share is used to ingest snappable data from the client or to expose snapshots of snappables to the client for restore and live mount operations.

19. The apparatus of claim 15, wherein, to access the file, the instructions are executable by the processor to cause the apparatus to:

return, to a client associated with the SID, a read response that includes data from the file stored within the distributed file system.

20. A non-transitory computer-readable medium storing code for data management, the code comprising instructions executable by a processor to:

receive, at a server hosted by a storage node within a cluster of storage nodes in a data management system (DMS), a request to access a file stored in a distributed file system of the DMS, wherein the request indicates a security identifier (SID) associated with the request;

transmit, from the server to a shared repository that is accessible to the storage nodes within the cluster, an indication of the SID associated with the request;

receive, at the server and from the shared repository, an indication of a mapping between the SID associated with the request and one or both of a user identifier (UID) or a group identifier (GID) associated with the SID;

transmit, to the distributed file system, an indication of the file and one or both of the UID or the GID provided by the shared repository;

determine, by the distributed file system, whether to grant the request to access the file based at least in part on comparing the UID and the GID provided by the server to a set of identifiers stored at the distributed file system in association with the file; and access, by the distributed file system, the file in accordance with the request based at least in part on determining that one or both of the UID or the GID is included in the set of identifiers stored at the distributed file system in association with the file.

* * * * *